United States Patent [19]

Iizuka

[11] Patent Number: 4,551,316
[45] Date of Patent: Nov. 5, 1985

[54] PROCESS FOR PRODUCING BORON NITRIDE OF CUBIC SYSTEM

[75] Inventor: Eiichi Iizuka, Shiojiri, Japan

[73] Assignee: Showa Denko Kabushiki Kaisha, Tokyo, Japan

[21] Appl. No.: 438,609

[22] Filed: Nov. 2, 1982

[30] Foreign Application Priority Data

Nov. 12, 1981 [JP] Japan .................................. 56-181391

[51] Int. Cl.$^4$ ........................ B01J 21/02; C01B 35/00; C01B 21/064
[52] U.S. Cl. .................................. 423/290; 423/276; 502/202
[58] Field of Search ................. 252/432; 423/276, 290

[56] References Cited

U.S. PATENT DOCUMENTS

| | | | |
|---|---|---|---|
| 2,947,617 | 8/1960 | Wentorf, Jr. | 423/290 X |
| 3,876,751 | 4/1975 | Alexeevsky et al. | 423/290 |
| 4,148,863 | 4/1979 | Farafontov et al. | 423/290 |
| 4,287,164 | 9/1981 | Endo et al. | 423/290 |
| 4,297,387 | 10/1981 | Beale | 204/192 C X |
| 4,349,517 | 9/1982 | Lysanov et al. | 423/290 |
| 4,361,543 | 11/1982 | Zhdanovich et al. | 423/290 |
| 4,469,802 | 9/1984 | Endo et al. | 423/290 X |

FOREIGN PATENT DOCUMENTS

| | | | |
|---|---|---|---|
| 2461821 | 7/1976 | Fed. Rep. of Germany | 423/290 |
| 56-140013 | 11/1981 | Japan | 252/432 |
| 56-140015 | 11/1981 | Japan | 252/432 |
| 56-140014 | 11/1981 | Japan | 252/432 |
| 0506438 | 9/1954 | Switzerland | 423/290 |

Primary Examiner—D. E. Gantz
Assistant Examiner—William G. Wright
Attorney, Agent, or Firm—McAulay, Fields, Fisher, Goldstein & Nissen

[57] ABSTRACT

A boron nitride type compound of the formula: $LiMBN_2$ where M is calcium or barium and other similar compounds are provided. These compounds are prepared by heating a mixture of (i) finely divided $Li_3N$ or metallic lithium, (ii) finely divided alkaline earth metal nitride selected from $Ca_3N_2$, $Mg_3N_2$, $Sr_3N_2$, $Ba_3N_2$ and $Be_3N_2$, and/or an alkaline earth metal selected from Ca, Mg, Sr, Ba and Be, and (iii) hexagonal boron nitride at 800° to 1,300° C. in an inert gas or ammonia atmosphere thereby to react the ingredients (i), (ii) and (iii) with each other in a molten state, and then, cooling the reaction product to be solidified. The above-mentioned compounds are useful as a catalyst for use in the production of cubic boron nitride from hexagonal boron nitride.

11 Claims, 4 Drawing Figures

PROCESS FOR PRODUCING BORON NITRIDE OF CUBIC SYSTEM

BACKGROUND OF THE INVENTION

(1) Field of the Invention

This invention relates to novel boron nitride compounds which are useful as a catalyst for the production of boron nitride of the cubic system. It also relates to a process for preparing such boron nitride compounds and a process for producing boron nitride of the cubic system by using such boron nitride compounds.

(2) Description of the Prior Art

As is well known, boron nitride of the cubic system has a hardness close to that of diamond and is excellent over diamond in the chemical stability. Therefore, the demand for cubic boron nitride as an abrasive material such as an abrasive grain is now increasing.

For the industrial production of this cubic boron nitride, there has ordinarily been adopted a method wherein a mixture of a hexagonal boron nitride powder with a catalyst powder is heated at a high pressure of about 40 to about 60 Kbar and a high temperature of about 1,400° to about 1,600° C. to convert boron nitride of the hexagonal cubic system to boron nitride of the cubic system. As the catalyst used in this method, nitrides of alkali metals or alkaline earth metals, and boron nitride ternary compounds consisting of an alkali metal or alkaline earth metal, nitrogen and boron, for example, $Ca_3B_2N_4$ and $Li_3BN_2$ are known. According to this method, hexagonal boron nitride is dissolved in a melt of the catalyst and cubic boron nitride is precipitated by utilizing the fact that the solubility of cubic boron nitride in the eutectic melt is lower than that of hexagonal boron nitride under the preparation conditions.

It is required for an abrasive material to have a high mechanical strength, especially a high crushing strength, and from the viewpoint of the strength, it is required that the abrasive material should have a good grain shape characteristic. That is, the abrasive grain should have neither a flat shape nor a shape having sharp edges but it should have a shape as spherical as possible and the presence of convexities and concavities on the surface of the grain should be avoided. In the conventional method for the production of cubic boron nitride using the above-mentioned nitride (binary compound) or boron nitride ternary compound as the catalyst, however, it is difficult to obtain cubic boron nitride having high mechanical strengths and a good grain shape characteristic. Namely, according to the conventional method using a known catalyst, the desired mechanical strengths and grain shape characteristic cannot be obtained unless the preparation conditions are controlled considerably precisely.

The inventor made researches with a view to improving the mechanical strength and grain shape characteristic of cubic boron nitride by using a catalyst different from the known catalysts heretofore used in the art. As the result, a novel substance could be prepared, and it has been found that this novel substance is valuable as a catalyst for the synthesis of cubic boron nitride and when this novel substance is used as the catalyst, cubic boron nitride which is prominently excellent in the mechanical strengths and grain shape characteristic over products obtained according to the conventional method can be prepared.

SUMMARY OF THE INVENTION

It is therefore an object of the present invention to provide a novel boron nitride compound valuable as a catalyst for the production of cubic boron nitride.

Another object of the present invention is to provide a process for preparing the novel boron nitride compound.

Still another object of the present invention is to provide a process for producing cubic boron nitride excellent in the mechanical strengths and grain shape characteristic by using the novel boron nitride compound as a catalyst.

More specifically, in accordance with one aspect of the present invention, there is provided a novel quaternary boron nitride compound represented by the molecular formula $LiMBN_2$, wherein M is calcium or barium.

In accordance with another aspect of the present invention, there is provided a process for preparing a boron nitride catalyst, which comprises maintaining a mixture of (i) a finely divided lithium nitride ($Li_3N$) or metallic lithium powder, (ii) a finely divided powder of at least one alkaline earth metal nitride or alkaline earth metal selected from the group consisting of calcium nitride ($Ca_3N_2$), magnesium nitride ($Mg_3N_2$), strontium nitride ($Sr_3N_2$), barium nitride ($Ba_3N_2$) beryllium nitride ($Be_3N_2$), metallic calcium, metallic magnesium, metallic strontium, metallic barium and metallic beryllium, and (iii) hexagonal boron nitride (BN), at a temperature of at least 800° C. in an atmosphere of an inert gas or ammonia thereby to react the ingredients (i), (ii) and (iii) with each other in a molten state, and then, cooling the reaction product to be solidified.

In accordance with still another aspect of the present invention, there is provided a boron nitride catalyst for use in the production of boron nitride of the cubic system, which catalyst is prepared by the above-mentioned process.

In accordance with a further aspect of the present invention, there is provided a process for the production of boron nitride of the cubic system, wherein boron nitride of the hexagonal crystal system is maintained in the presence of the above-mentioned boron nitride catalyst in a high-temperature and high-pressure region in which boron nitride of the cubic system is thermodynamically stable.

DESCRIPTION OF THE PREFERRED EMBODIMENTS

Figure 1:
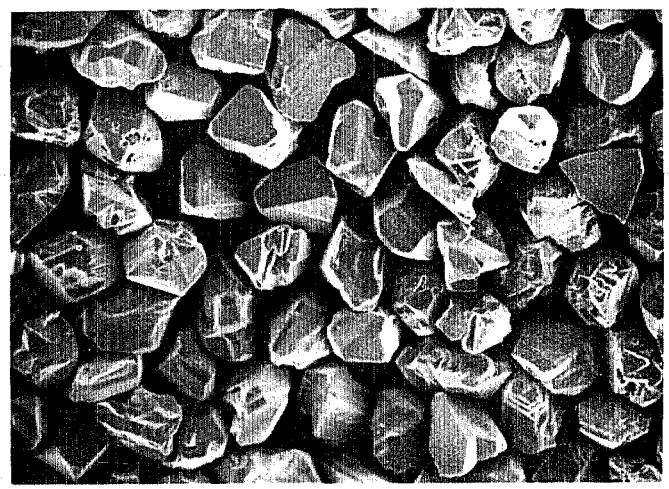
FIG. 1 is an enlarged microscope photograph (100 magnifications) of the crystal grain of cubic boron nitride prepared according to the present invention.

The boron nitride compounds of the present invention which are valuable as a catalyst for the production of boron nitride of the cubic system, are prepared as follows.

As the starting materials, (i) a finely divided lithium nitride ($Li_3N$) or metallic lithium powder, (ii) a finely divided alkaline earth metal nitride or alkaline earth metal powder and (iii) a finely divided boron nitride (BN) powder are prepared. As the boron nitride (BN), hexagonal boron nitride is used. As the alkaline earth metal, calcium, magnesium, strontium, barium and beryllium are used. As the alkaline earth metal nitride, nitrides of these alkaline earth metals are used. These alkaline earth metals and their nitrides may be used either alone or in combination.

The above-mentioned starting materials are mixed together at a mixing ratio described hereinafter, and the powdery mixture is charged in an appropriate vessel and then heated in an atmosphere of an inert gas such as $N_2$ or Ar, or of ammonia. When the temperature is elevated at this heating step, generation of heat is started at about 700° C. and it is construed that the reaction is initiated at this temperature. Since the mixture is melted at about 800° to about 900° C., the mixture is maintained at a temperature higher than 800° C., preferably at about 900° C., to advance the fusion reaction. It is preferable that the mixture be maintained at a temperature of not higher than about 1,300° C. If the reaction temperature exceeds about 1,300° C., the reaction product is liable to be thermally decomposed. It is preferable that the mixture be maintained at the reaction temperature for a period of about 20 to about 60 minutes. After the mixture is thus maintained at the above-mentioned reaction temperature, the melt is cooled to be thereby solidified in the inert atmosphere to obtain the novel boron nitride compound according to the present invention.

Incidentally, when this compound is used for the production of boron nitride of the cubic system, it is preferable that the solidified compound be pulverized to a size smaller than 150 mesh in an inert gas atmosphere.

The mixing ratio of the respective starting materials may be as follows. Namely, it is preferable that the atomic ratio of Li, alkaline earth metal, B and N in the mixture be adjusted to $(1-1.4):(1-1.4):1:2$. Accordingly, for example, when $Li_3N$, $Ca_3N$ and BN are used as the starting materials, it is preferable that the molar ratio of $Li_3N$, $Ca_3N_2$ and BN be $(1-1.4):(1-1.4):3$. When metallic lithium is used as the lithium source or an alkaline earth metal is used as the alkaline earth metal source, or when a substance other than $Li_3N$ or $M_3N_2$ (M=alkaline earth metal) is used as the lithium source or alkaline earth metal source, even if the molecular ratio of Li, M and B is adjusted to $(1-1.4):(1-1.4):1$, it sometimes happens that the molecular ratio of N in the mixture is lower than 2. In this case, it is preferable that the deficiency of nitrogen be compensated by using nitrogen gas as the inert gas atmosphere at the step of heating the mixture. The boron nitride compound prepared by using the respective starting materials in the amounts satisfying the above-mentioned molar ratio exhibits a high catalyst activity for the preparation of cubic boron nitride from hexagonal boron nitride.

The chemical structure of the so prepared boron nitride compounds could not exactly be determined. However, it is clear that these compounds are not mere mixtures of the starting materials but novel substances as substantiated in the Examples given hereinafter. It also has been found that, when metallic calcium or barium, or calcium nitride or barium nitride is used as the alkaline earth metal source, the resultant boron nitride compound is of the molecular structure Li-$CaBN_2$ or $LiBaBN_2$ as substantiated in Examples 1 through 4 given hereinafter.

The above-mentioned boron nitride catalyst, such as those which are represented by the formula $LiCaBN_2$ or $LiBaN_2$, can also be prepared by using the following combinations of starting materials:

(1) (i) finely divided lithium nitride ($Li_3N$) or metallic lithium powder, (ii) a finely divided $M_3B_2N_4$ (M: alkaline earth metal) powder and (iii) a finely divided boron nitride powder;

(2) a combination of (i) a finely divided $Li_3BN_2$ powder, (ii) a finely divided alkaline earth metal nitride or metallic alkaline earth metal powder and (iii) a finely divided boron nitride powder; or (3) a combination of (i) a finely divided $Li_3BN_2$ powder and (ii) a finely divided $M_3B_2N_4$ (M: alkaline earth metal) powder. In either case of these three combinations, the reaction temperature and atmosphere, the mixing ratio of the respective starting materials and other conditions may be similar to those which are described above.

The process for producing boron nitride of the cubic system by using the boron nitride compound prepared according to the above-mentioned method as the catalyst will now be described.

At first, 100 parts by weight of hexagonal boron nitride, preferably in the form of a powder having a size smaller than 150 mesh, is homogeneously mixed with 5 to 50 parts by weight, preferably 10 to 30 parts by weight, of the above-mentioned boron nitride compound, preferably in the form of a powder having a size smaller than 150 mesh, as the catalyst. The mixture is subjected to the compression powder molding. Alternatively, the above-mentioned powders of the hexagonal boron nitride and the catalyst are independently subjected to the compression powder molding to form thin plates, and the respective thin plates are laminated at the above-mentioned mixing ratio. Then, the powder compression molded mixture or the laminate is maintained in a high-temperature and high-pressure region in which boron nitride of the cubic system is thermodynamically stable, preferably at a temperature of 1,300° to 1,600° C. and at a pressure of 40 to 60 Kbar, for 5 to 40 minutes, whereby boron nitride of the cubic system can be obtained. These temperature, pressure and time conditions may be the same as those adopted in the conventional method.

Figure 2:
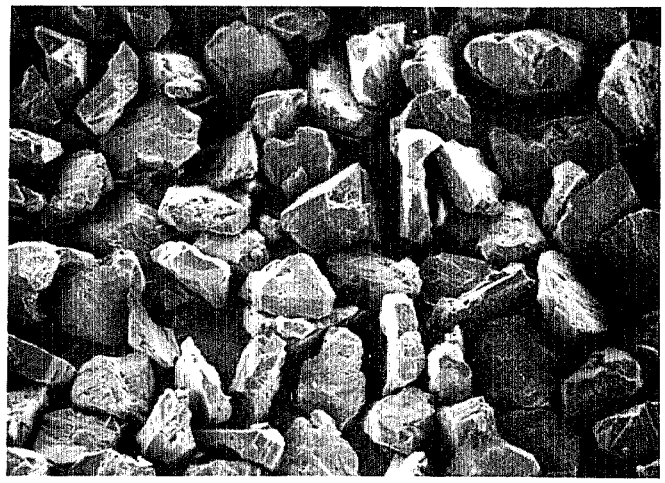
FIG. 2 is an enlarged microscope photograph (100 magnifications) of the crystal grain of cubic boron nitride prepared according to a conventional process.
Figure 4:
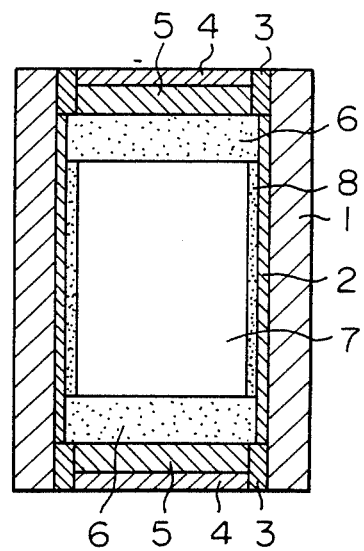
FIG. 4 is a longitudinally sectional view showing an example of the reaction vessel used for preparing boron nitride of the cubic system by using the novel boron nitride compound as a catalyst.

Application of such high temperature and high pressure can be accomplished by placing the powder compression molded mixture or laminate in a reaction vessel as shown in FIG. 2 and electricity is applied while compressing the molded mixture or laminate by a press. Referring to FIG. 4, an outer wall 1 of the vessel is formed of pyrophyllite as a pressure transfer member to have a cylindrical shape, and a heater 2 consisting of a graphite cylinder and a pyrophyllite barrier 8 are arranged on the inner side of the outer wall 1. An electricity applying steel ring 3 and an electricity applying steel plate 4 are arranged on the upper and lower ends of the vessel, respectively, and on the inner side, there are disposed a sintered alumina plate 5 and a pressure transfer member 6 composed of pyrophyllite. The space defined by the pyrophyllite barrier 6 and the pyrophyllite member 8 is a chamber 7 for receiving the starting materials to be reacted.

The invention will now be described by the following examples and comparative examples.

EXAMPLE 1

5 g of Li$_3$N powder, 20 g of Ca$_3$N$_2$ powder and 10 g of hexagonal BN powder, each being pulverized to a size smaller than 150 mesh, were mixed together, and the mixture was charged in a platinum vessel. The temperature of the mixture was elevated by heating in an electrical furnace while circulating N$_2$ gas at a rate of 8 l/min, and the mixture was maintained at 900° C. for 40 minutes. The reaction product was cooled in the electrical furnace in a current of N$_2$ gas, and then, the reaction product was pulverized to a size smaller than 150 mesh in an atmosphere of N$_2$ gas.

The structure of the so-obtained powdery reaction product was analyzed by the X-ray diffractometry to obtain the results shown in the most right column of Table 1. The ASTM card data of known substances such as the starting materials used in the above reaction are also shown in Table 1.

Figure 3:
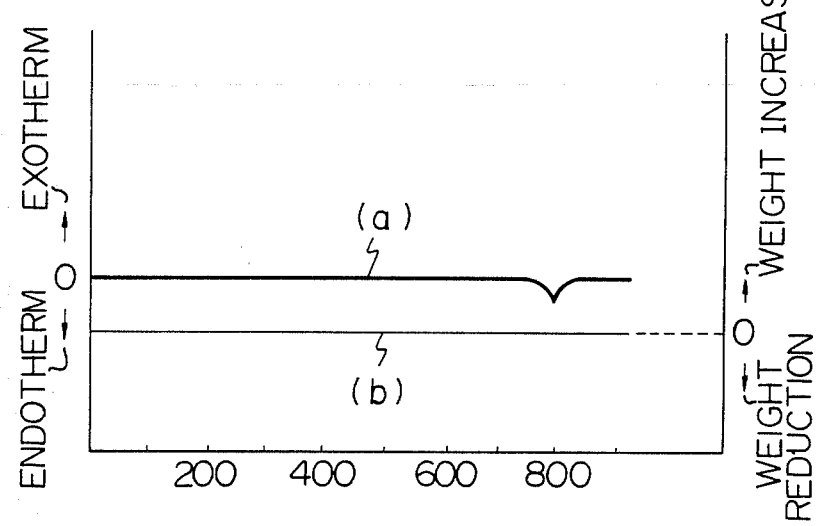
FIG. 3 is a graph illustrating the results of the thermal analysis of an example of the novel boron nitride compounds of the present invention.

From the results shown in Table 1, it is apparent that the substance prepared in Example 1 is not a mere mixture of the known starting materials but a novel substance having a novel structure. When the foregoing results were examined in the light of the results of the chemical analysis (the Li content was determined according to the flame photometric determination method, the Ca content was determined according to the EDTA method, the B content was determined according to the mannitol method and the N content was calculated by subtraction of these contents), it has been found that the product is a novel boron nitride compound having the molecular formula LiCaBN$_2$, and it is construed that the product has a body-centered cubic crystal structure in which 12 molecules are included in the unit cell. The results of the thermal analysis (differential thermal analysis and thermogravimetric analysis) of this novel compound are shown in FIG. 3, wherein "a" and "b" are a differential thermal analysis curve and a thermogravimetric analysis curve, respectively, and the ordinate signifies an endothermic and exothermic change in the differential thermal analysis and weight reduction and increase in the thermogravimetric analysis, and the abscissa signifies temperature (°C.). It has also been found that the melting and solidification point is about 780° to about 820° C. The thermal analysis was carried out at a temperature-elevating rate of 10° C./min in a nitrogen atmosphere by using $\alpha$-Al$_2$O$_3$ as the reference substance. This compound showed a grey color when it was cooled to be solidified. The actually measured value of the specific gravity of the novel compound is about 2.39 and the theoretical specific gravity calculated based on the body-centered cubic crystal structure in which 12 molecules are included in one cell is 2.383. Thus, it has been confirmed that the measured value is well in agreement with the theoretical value.

TABLE 1

Results of X-Ray Diffractometry

| Li$_3$N | | $\alpha$-Ca$_3$N$_2$ | | $\gamma$-Ca$_3$N$_2$ | | Li$_3$BN$_2$ | | Ca$_3$B$_2$N$_4$ | | Novel Compound of Present Invention | |
|---|---|---|---|---|---|---|---|---|---|---|---|
| d (Å) | I/I$_1$ | d (Å) | I/I$_1$ | d (Å) | I/I$_1$ | d (Å) | I/I$_1$ | d (Å) | I/I$_1$ | d (Å) | I/I$_1$ |
| 3.874 | 100 | 4.06 | 2 | 8.92 | 65 | 3.82 | 60 | 5.16 | 80 | 3.55 | 20 |
| 3.158 | 83 | 3.31 | 18 | 6.95 | 15 | 3.52 | 80 | 3.65 | 20 | 2.90 | 16 |
| 2.448 | 4 | 3.06 | 75 | 5.94 | 15 | 2.823 | 100 | 2.788 | 20 | 2.510 | 100 |
| 1.937 | 19 | 2.866 | 75 | 3.32 | 25 | 2.637 | 80 | 2.585 | 100 | 2.247 | 4 |
| 1.824 | 45 | 2.695 | 4 | 3.07 | 30 | 2.243 | 40 | 2411 | 80 | 2.050 | 48 |
| 1.651 | 30 | 2.532 | 2 | 2.97 | 15 | 2.067 | 100 | 2.309 | 80 | 1.777 | 21 |
| 1.579 | 4 | 2.442 | 70 | 2.87 | 35 | 1.929 | 40 | 2.108 | 80 | 1.674 | 4 |
| 1.328 | 20 | 2.245 | 10 | 2.79 | 100 | 1.831 | 20 | 1.945 | 40 | 1.589 | 15 |
| | | 2.095 | 8 | 2.77 | 10 | 1.746 | 60 | 1.828 | 80 | 1.450 | 15 |
| | | 2.025 | 100 | 2.70 | 20 | 1.642 | 100 | 1.722 | 60 | 1.256 | 23 |
| | | 1.859 | 6 | 2.58 | 30 | 1.554 | 60 | 1.704 | 60 | | |
| | | 1.802 | 2 | 2.49 | 70 | 1.486 | 40 | 1.634 | 40 | | |
| | | 1.769 | 10 | 2.42 | 30 | 1.425 | 40 | 1.561 | 40 | | |
| | | 1.727 | 2 | 2.27 | 70 | 1.400 | 40 | 1.492 | 80 | | |
| | | 1.690 | 10 | 2.02 | 10 | 1.319 | 40 | 1.433 | 20 | | |
| | | 1.653 | 12 | 1.860 | 30 | 1.288 | 40 | 1.397 | 20 | | |
| | | 1.621 | 2 | 1.790 | 25 | 1.252 | 40 | 1.291 | 80 | | |
| | | 1.561 | 35 | 1.740 | 30 | | | 1.254 | 40 | | |
| | | 1.455 | 25 | 1.665 | 10 | | | | | | |
| | | 1.432 | 8 | 1.640 | 20 | | | | | | |
| | | | | 1.575 | 25 | | | | | | |
| | | | | 1.520 | 15 | | | | | | |
| | | | | 1.480 | 20 | | | | | | |
| | | | | 1.450 | 30 | | | | | | |

EXAMPLE 2

As is apparent from Run No. 1-1 of Table 2 given hereinafter, in Example 1, the amounts of Li$_3$N, Ca$_3$N$_2$ and BN were adjusted so that the molar ratio (1:1:3) corresponding stocihiometrically to LiCaBN$_2$ was attained. In this Example 2, the amounts of Li$_3$N and Ca$_3$N$_2$ were slightly deviated from the stoichiometric ratios to BN.

Li$_3$N powder, Ca$_3$N$_2$ powder and BN powder were mixed at molar ratios shown in Run No. 2 through 5 of Table 2, and the mixtures were treated in the same manner as described in Example 1.

TABLE 2

| | Run No. | Mixing Ratios (molar ratios) of Starting Materials | | |
|---|---|---|---|---|
| | | Li$_3$N | Ca$_3$N$_2$ | BN |
| Example 1 | 1-1 | 1.0 | 1.0 | 3.0 |
| Example 2 | 2-1 | 1.2 | 1.0 | 3.0 |
| " | 2-2 | 1.4 | 1.0 | 3.0 |
| " | 2-3 | 1.0 | 1.2 | 3.0 |
| " | 2-4 | 1.0 | 1.4 | 3.0 |

When the substances obtained in Example 2 were subjected to the X-ray diffractometry, it was confirmed that these substances have a structure such that the quaternary compound phase obtained in Example 1 is combined with the excessive component of $Li_3N$ or $Ca_3N_2$.

EXAMPLE 3

Following the same procedure as that described in Example 1, a boron nitride compound was prepared wherein a $Ba_3N_2$ powder was used instead of the $Ca_3N_2$ powder.

The structure of the so-obtained powdery reaction product was analyzed by the X-ray diffractometry to obtain the results shown in the most right column of Table 3. The ASTM card data of known substances such as the starting materials used in the above reaction are shown in Table 3.

From the results shown in Table 3, it is apparent that the substance obtained in Example 3 is not a mere mixture of the known starting materials but a novel substance having quite a novel structure. When the foregoing results were examined in the light of the results of the chemical analysis (the Li content was determined according to the flame photometric determination method, the barium content was determined according to the EDTA method, the boron content was determined according to the mannitol method and the N content was calculated by subtraction of these contents), it has been found that the product is a novel boron nitride compound having the molecular formula $LiBaBN_2$. It is construed from the integer ratios and the hkl values in Table 3 that the product has a body-centered cubic crystal structure in which 12 molecules are included in the unit cell. The results of the thermal analysis of this novel compound, it was found that the melting and solidification point is about 800° C. The actually measured value of the specific gravity of the novel compound is about 2.50 and the theoretical specific gravity calculated based on the body-centered cubic crystal structure in which 12 molecules are included in one cell is 2.494. Thus, it has been confirmed that the measured value is well in agreement with the theoretical value.

EXAMPLE 4

As is apparent from Run No. 1-1 of Table 4 given hereinafter, in Example 3, the amounts of $Li_3N$, $Ba_3N_2$ and BN were adjusted so that the molar ratio (1:1:3) corresponding stoichiometrically to $LiBaBN_2$ was attained. In this Example 4 given below, the amounts of $Li_3N$ and $Ba_3N_2$ were slightly deviated from the stoichiometric ratios to BN.

$Li_3N$ powder, $Ba_3N_2$ powder and BN powder were mixed at molar ratios shown in Run No. 4-1 through 4-4 of Table 4, and the mixtures were treated in the same manner as described in Example 3.

TABLE 4

|  | Run No. | Mixing Ratios (molar ratios) of Starting Materials | | |
|---|---|---|---|---|
|  |  | $Li_3N$ | $Ba_3N_2$ | BN |
| Example 3 | 3-1 | 1.0 | 1.0 | 3.0 |
| Example 4 | 4-1 | 1.2 | 1.0 | 3.0 |
| " | 4-2 | 1.4 | 1.0 | 3.0 |
| " | 4-3 | 1.0 | 1.2 | 3.0 |
| " | 4-4 | 1.0 | 1.4 | 3.0 |

When the substances obtained in Example 4 were subjected to the X-ray diffractometry, it was confirmed that these substances have a structure such that the quaternary compound phase obtained in Example 3 is combined with the excessive component of $Li_3N$ or $Ba_3N_2$.

EXAMPLE 5

A lithium nitride powder, an alkaline earth metal nitride powder and a hexagonal boron nitride powder, each being pulverized to a size smaller than 150 mesh, were mixed together at the mixing ratio shown in Table 5, below. The mixture was charged in a platinum vessel. The temperature of the mixture was elevated by heating in an electrical furnace while circulating $N_2$ gas at a rate of 8 l/min, and the mixture was maintained under the temperature and time conditions shown in Table 5, below. The reaction product was cooled in the electrical furnace in a current of $N_2$ gas, and then, the reaction product was pulverized to a size smaller than 150 mesh in an atmosphere of $N_2$ gas.

TABLE 3

| Results of X-Ray Diffractometry | | | | | | | | | | | |
|---|---|---|---|---|---|---|---|---|---|---|---|
| $Li_3N$ | | $Li_3BN_2$ | | $Ba_3N_2$ ABTM 27-39 | | $Ba_3B_2N_4$ | | Novel Compound of Present Invention | | | |
| d (Å) | $I/I_1$ | d (Å) | $I/I_1$ | d (Å) | $I/I_1$ | d (Å) | $I/I_1$ | d (Å) | $I/I_1$ | Integer Ratio | hkl |
| 3.874 | 100 | 3.82 | 60 | 2.93 | 100 | 3.13 | 60 | 3.94 | 73 | 4 | (200) |
| 3.158 | 83 | 3.52 | 80 | 3.73 | 80 | 2.78 | 100 | 3.21 | 5 | 6 | (211) |
| 2.448 | 4 | 2.823 | 100 | 3.31 | 80 | 2.60 | 60 | 2.78 | 100 | 8 | (220) |
| 1.937 | 19 | 2.637 | 80 | 2.00 | 80 | 2.281 | 60 | 2.27 | 49 | 12 | (222) |
| 1.824 | 45 | 2.243 | 40 | 1.91 | 80 | 1.993 | 60 | 1.970 | 23 | 16 | (400) |
| 1.651 | 30 | 2.067 | 100 | 1.75 | 80 | 1.824 | 30 | 1.861 | 3 | 18 | (330) |
| 1.579 | 4 | 1.929 | 40 | 2.08 | 70 | 1.774 | 30 | 1.760 | 32 | 20 | (420) |
| 1.328 | 20 | 1.831 | 20 | 1.86 | 70 | 1.623 | 100 | 1.607 | 34 | 24 | (422) |
|  |  | 1.746 | 60 |  |  | 1.370 | 30 | 1.391 | 13 | 32 | (440) |
|  |  | 1.642 | 100 |  |  | 1.331 | 60 | 1.312 | 17 | 36 | (600) |
|  |  | 1.554 | 60 |  |  | 1.259 | 60 | 1.245 | 7 | 40 | (620) |
|  |  | 1.486 | 40 |  |  | 1.105 | 30 |  |  |  |  |
|  |  | 1.425 | 40 |  |  | 1.068 | 60 |  |  |  |  |
|  |  | 1.400 | 40 |  |  | 0.9423 | 100 |  |  |  |  |
|  |  | 1.319 | 40 |  |  | 0.8911 | 60 |  |  |  |  |
|  |  | 1.288 | 40 |  |  |  |  |  |  |  |  |
|  |  | 1.252 | 40 |  |  |  |  |  |  |  |  |

TABLE 5

| Run No. | Mixing Ratio (Molar Ratio) | | | | | Temp. (°C.) | Time (min.) |
|---|---|---|---|---|---|---|---|
| | Li$_3$N, | Mg$_3$N, | Sr$_3$N, | Be$_3$N, | BN | | |
| 5-1 | 1 | 1 | | | 3 | 900 | 60 |
| 5-2 | 1.1 | | 1.1 | | 3 | " | " |
| 5-3 | 1.2 | | | 1.4 | 3 | " | " |
| 5-4 | 1.4 | | 1.0 | | 3 | 950 | 40 |
| 5-5 | 1.1 | 1.2 | | | 3 | " | " |
| 5-6 | 1 | | 1 | | 3 | " | " |

EXAMPLE 6

A lithium nitride powder, two kinds of alkaline earth metal nitride powders and a hexagonal boron nitride powder, each being pulverized to a size smaller than 150 mesh, were mixed together at the mixing ratio shown in Table 6, below. The mixture was charged in a platinum vessel. The temperature of the mixture was elevated by heating in an electrical furnace while circulating N$_2$ gas at a rate of 8 l/min, and the mixture was maintained under the temperature and time conditions shown in Table 6, below. The reaction product was cooled in the electrical furnace in a current of N$_2$ gas, and then, the reaction product was pulverized to a size smaller than 150 mesh in an atmosphere of N$_2$ gas.

TABLE 6

| Run No. | Mixing Ratio (Molar Ratio) | | | | | | | Temp. (°C.) | Time (min.) |
|---|---|---|---|---|---|---|---|---|---|
| | Li$_3$N, | Be$_3$N, | Mg$_3$N, | Ca$_3$N, | Sr$_3$N, | Ba$_3$N, | BN | | |
| 6-1 | 1 | | 0.9 | 4 | | | 3 | 1000 | 60 |
| 6-2 | 1 | | 0.8 | 0.6 | | | 3 | " | " |
| 6-3 | 1.2 | | | 0.8 | | 0.6 | 3 | 900 | 40 |
| 6-4 | 1.1 | 0.6 | | 0.6 | | | 3 | 850 | 30 |
| 6-5 | 1.1 | | | | 1.0 | 0.4 | 3 | 800 | 40 |
| 6-6 | 1.1 | 0.3 | 0.3 | 0.5 | | | 3 | 950 | 40 |
| 6-7 | 1.1 | 0.4 | 0.4 | | 0.4 | | 3 | 900 | 30 |
| 6-8 | 1.3 | | 0.2 | 0.5 | 0.5 | | 3 | 950 | 40 |
| 6-9 | 1.1 | | | 0.6 | 0.6 | 0.2 | 3 | 900 | 30 |
| 6-10 | 1.2 | | 0.3 | 0.4 | 0.4 | 0.3 | 3 | 850 | 40 |

EXAMPLE 7

In a nitrogen atmosphere, 2.5 g of the quaternary boron nitride compound in the form of a powder having a size smaller than 150 mesh, which was obtained in Example 1, was homogeneously mixed with 8.0 g of hexagonal boron nitride in the form of a powder having a size smaller than 150 mesh. The mixture was molded under a face pressure of 700 Kg/cm$^2$ into a rod having an outer diameter of 20 mm and a length of 20 mm. The rod was placed in the reaction vessel shown in FIG. 4 and was maintained at 50 Kbar and 1,450° C. for 15 minutes by using a high pressure press to form cubic boron nitride.

Comparative Example 1

2.5 g of Li$_3$N powder having a size smaller than 150 mesh as the catalyst was homogeneously mixed with 8.0 g of a powder of hexagonal boron nitride having a size smaller than 150 mesh in a nitrogen atmosphere, and cubic boron nitride was formed from the mixture in the same manner as described in Example 7.

Comparative Example 2

Cubic boron nitride was formed in the same manner as described in Comparative Example 1 except that Ca$_3$B$_2$N$_4$ was used as the catalyst.

Comparative Example 3

Cubic boron nitride was formed in the same manner as described in Comparative Example 1 except that Li$_3$BN$_2$ was used as the catalyst.

Comparative Example 4

A powder of Ca$_3$B$_2$N$_4$ having a size smaller than 150 mesh was mixed with a powder of Li$_3$BN$_2$ having a size smaller than 150 mesh at a molar ratio of 1:1. 2.5 g of the mixture as the catalyst was homogeneously mixed with 8.0 g of hexagonal boron nitride in a nitrogen atmosphere and the mixture was treated in the same manner as described in Example 7 to form cubic boron nitride.

Cubic boron nitride grains prepared in Example 7 and Comparative Examples 1 through 4 were subjected to the crushing test to determine the crushing strength. The obtained results are shown in Table 7. The crushing test was carried out according to the following procedures. One specimen grain having a diameter of 100 to 150 μm was placed on a lower cylinder of an upper-lower cylinder made of WC-Co and having a diameter of 10 mm, and the upper cylinder was brought down by a direct current motor. The position where the upper cylinder fell in contact with the specimen grain on the lower cylinder was electrically detected, and the corresponding distance D between the surfaces of the upper and lower cylinders was determined as the diameter of the grain. The load was gradually increased and the crushing strength $\sigma_t$ was calculated from the total load W crushing the grain according to the following known formula (1):

$$\sigma_t = W/(0.32D)$$

Practically, 50 specimens were tested, and the mean values of D and W were determined and the average crushing strength was calculated according to the formula (1). Incidentally, the formula (1) is elucidated by Mr. Hiroyuki Yoshikawa on page 310 of "Rikagaku Kenkyusho Hokoku (Japan), 39, No. 6" (published in 1963).

Incidentally, also the reaction yields obtained in Example 7 and Comparative Examples 1 through 4 are shown in Table 7.

TABLE 7

| | Catalyst Used | Crushing Strength ($10^8$ Kg/m$^2$) of Crystal Grain | Reaction Yield (%) |
|---|---|---|---|
| Example 7 | LiCaBN$_2$ | 4.36 | 35.6 |
| Comparative Example 1 | Li$_3$N | 3.51 | 23.5 |
| Comparative Example 2 | Ca$_3$B$_2$N$_4$ | 3.34 | 21.9 |
| Comparative Example 3 | Li$_3$BN$_2$ | 3.49 | 23.3 |
| Comparative Example 4 | Ca$_3$B$_2$N$_4$ + | 3.63 | 24.6 |

TABLE 7-continued

| Catalyst Used | Crushing Strength ($10^8$ Kg/m$^2$) of Crystal Grain | Reaction Yield (%) |
|---|---|---|
| Li$_3$BN$_2$ | | |

From the results shown in Table 7, it is seen that in Example 7 in which the novel quaternary compound LiCaBN$_2$ prepared in advance was used as the catalyst, the crushing strength was considerably improved and also the reaction yield was improved as compared with the Comparative Examples in which the known catalytic substances were used. In comparative Example 4 in which Ca$_3$B$_2$N$_4$ and Li$_3$BN$_2$ were mixed at the same molecular ratio as that of the above-mentioned quaternary compound and the resulting mixture was used as the catalyst, such a high improvement of the strength as attained in Example 7 where LiCaBN$_2$ prepared in advance was used as the catalyst could not be attained. Thus, it was confirmed that in order to improve the strength, it is necessary to use the quaternary compound LiCaBN$_2$ prepared in advance as the catalyst.

An enlarged microscope photograph of the crystal grain of cubic boron nitride obtained in Example 7 is shown in FIG. 1, and an enlarged microscope photograph of the crystal grain of cubic boron nitride obtained in Comparative Example 2 is shown in FIG. 2. The crystal grains of cubic boron nitrides obtained in other Comparative Examples were substantially the same as that shown in the photograph of FIG. 2. When these photographs are compared with each other, it is seen that the crystal grains of cubic boron nitride obtained in Example 7 were of a shape substantially similar to a spherical shape as a whole and the number of fine convexities and concavities present on the surface of each grain was very small and the crystal grains had a shape suitable for an abrasive grain.

EXAMPLE 8

The reaction products obtained in Example 2, that is, the composite nitrides (LiCaBN$_2$ and the excessive starting material) obtained by mixing and reacting Li$_3$N, Ca$_3$N$_2$ and BN at the molar ratios of Run No. 2-1 through 2-4 in Table 2, were used as the catalyst, and these reaction products were independently mixed with hexagonal boron nitride and heated under pressure under the same conditions as those adopted in Example 7. The crushing strength of each of the obtained crystal grains was determined in the same manner as described above. The obtained results, as well as the crushing strength determined in Example 7, are shown in Table 8.

TABLE 8

| | Run No. in Table 2 | Crushing Strength ($10^8$ Kg/m$^2$) of Crystal Grain |
|---|---|---|
| Example 7 | 1-1 | 4.36 |
| Example 8 | 2-1 | 4.25 |
| " | 2-2 | 4.43 |
| " | 2-3 | 4.27 |
| " | 2-4 | 4.19 |

From the results shown in Table 8, it is seen that even when a reaction product obtaining by using the starting materials (Li$_3$N, Ca$_3$N$_2$ and BN) in amounts slightly deviating from the stoichiometric ratio necessary for the synthesis of LiCaBN$_2$ in the range of [(1–1.4):(1–1.4):1], that is, a composite nitride comprising Li-CaBN$_2$ and the excessive component, is used as the catalyst, the crushing strength can be improved as well as in Example 7 where LiCaBN$_2$ is used as the catalyst.

EXAMPLE 9

Following the same procedure as that described in Example 7, cubic boron nitride was prepared wherein the quaternary boron nitride compound powder prepared in Example 3 was used instead of the quaternary boron nitride compound powder prepared in Example 1.

Comparative Example 5

Cubic boron nitride was formed in the same manner as described in Comparative Example 1 except that Ba$_3$B$_2$N$_4$ was used as the catalyst.

Comparative Example 6

A powder of Ba$_3$B$_2$N$_4$ having a size smaller than 150 mesh was mixed with a powder of Li$_3$BN$_2$ having a size smaller than 150 mesh at a molar ratio of 1:1, and 2.5 g of the mixture as the catalyst was homogeneously mixed with 8.0 g of hexagonal boron nitride in a nitrogen atmosphere. The mixture was treated in the same, manner as described in Example 9 to form cubic boron nitride in the same manner as that described in Example 7 and Comparative Examples 1 through 4.

Cubic boron nitride grains prepared in Example 9 and Comparative Examples 5 and 6 were subjected to the crushing test to determine the crushing strength. The obtained results are shown in Table 9.

Incidentally, also the reaction yields obtained in Example 9 and Comparative Examples 1, 3, 5 and 6 are shown in Table 3.

TABLE 9

| | Catalyst Used | Crushing Strength ($10^8$ Kg/m$^2$) of Crystal Grain | Reaction Yield (%) |
|---|---|---|---|
| Example 9 | LiBaBN$_2$ | 4.38 | 40.1 |
| Comparative Example 1 | Li$_3$N | 3.51 | 23.5 |
| Comparative Example 5 | Ba$_3$B$_2$N$_4$ | 3.22 | 25.1 |
| Comparative Example 3 | Li$_3$BN$_2$ | 3.49 | 23.3 |
| Comparative Example 6 | Ba$_3$B$_2$N$_4$ + Li$_3$BN$_2$ | 3.60 | 25.8 |

From the results shown in Table 9, it is seen that in Example 9 in which the novel quaternary compound LiBaBN$_2$ prepared in advance was used as the catalyst, the crushing strength was considerably improved and also the reaction yield was improved as compared with the Comparative Examples in which the known catalytic substances were used. In Comparative Example 6 in which Ba$_3$B$_2$N$_4$ and Li$_3$BN$_2$ were mixed at the same molecular ratio as that of the above-mentioned quaternary compound and the resulting mixture was used as the catalyst, such a high improvement of the strength as attained in Example 9 where LiBaBN$_2$ prepared in advance was used as the catalyst could not be attained. Thus, it was confirmed that in order to improve the strength, it is necessary to use the quaternary compound LiBaBN$_2$ prepared in advance as the catalyst.

EXAMPLE 10

The reaction products obtained in Example 4, that is, the composite nitrides (LiBaBN$_2$ and the excessive starting material) obtained by mixing and reacting Li$_3$N, $Ba_3N_2$ and BN at the molar ratios of specimen No. 4-1 through 4-4 in Table 4, were used as the catalyst, and these reaction products were independently mixed with hexagonal boron nitride and heated under pressure under the same conditions as those adopted in Example 9. The crushing strength of each of the obtained crystal grains was determined in the same manner as described above. The obtained results, as well as the crushing strength determined in Example 9, are shown in Table 10.

TABLE 10

|  | Specimen No. | Crushing Strength ($10^8$ Kg/m$^2$) of Crystal Grain |
|---|---|---|
| Example 9 | 3-1 | 4.38 |
| Example 10 | 4-1 | 4.26 |
| " | 4-2 | 4.41 |
| " | 4-3 | 4.30 |
| " | 4-4 | 4.18 |

From the results shown in Table 10, it is seen that even when a reaction product obtaining by using the starting materials ($Li_3N$, $Ba_3N_2$ and BN) in amounts slightly deviating from the stoichiometric ratio necessary for the synthesis of $LiBaBN_2$ in the range of [(1–1.4):(1–1.4):1], that is, a composite nitride comprising $LiBaBN_2$ and the excessive component, is used as the catalyst, the mechanical strength can be improved as well as in Example 9 where $LiBaBN_2$ is used as the catalyst.

EXAMPLE 11

In a nitrogen atmosphere, each of the reaction products in the form of a powder having a size smaller than 150 mesh, which were obtained in Example 5, was homogeneously mixed with hexagonal boron nitride in the form of a powder having a size smaller than 150 mesh at the mixing ratio shown in Table 11, below. The mixture was molded under a face pressure of 700 Kg/cm$^2$ into a rod having an outer diameter of 20 mm and a length of 20 mm. The rod was placed in the reaction vessel shown in FIG. 4 and was treated under the conditions shown in Table 11, below, by using a high pressure press to produce cubic boron nitride. The yield and crushing strength of the cubic boron nitride are shown in Table 11.

Comparative Examples 7, 8 and 9

For comparison purposes, the procedure mentioned in Example 11 was repeated wherein the following catalysts were used.

$Li_3BN_2$ powder (Comparative Example 7)

Mixture of $Li_3N$ powder, $Mg_3N_2$ powder and BN powder (1.1:1.2:3 by mole) (Comparative Example 8)

Mixture of $Li_3N$ powder, $Sr_3N_2$ powder and BN powder (1:1:3 by mole) (Comparative Example 9)

The reaction conditions employed and the yield and crushing strength of the cubic boron nitride prepared in each Comparative Example are shown in Table 11.

TABLE 11

| Example No. | HBN/Catalyst*[1] | Pressure (Kb) | Temp. (°C.) | Time (min.) | Yield (%) | Crushing Strength ($10^8$ Kg/cm$^2$) |
|---|---|---|---|---|---|---|
| Ex. 11-1 | 3 | 60 | 1500 | 10 | 38 | 4.25 |
| Ex. 11-2 | " | " | " | " | 35 | 4.01 |
| Ex. 11-3 | " | " | " | " | 40 | 4.12 |
| Ex. 11-4 | 5 | 56 | 1450 | 20 | 45 | 4.16 |
| Comp. Ex. 7 |  |  |  |  |  |  |
| Comp. Ex. 8 | 3 | 60 | 1500 | 10 | 18 | 3.50 |
| Comp. Ex. 9 | " | " | " | 20 | 22 | 3.60 |

*[1]Ratio of hexagonal boron nitride/catalyst by weight

Abrasive test was carried out on the cubic boron nitrides prepared in Example 11-4 and Comparative Example 9. Namely, grinding wheels were made by electrodeposition in a conventional manner. The grain size was 120/140 according to Japanese Industrial Standard B4130. Particulars of the grinding wheels and the grinding conditions were as follows.

| | |
|---|---|
| Grinding type: | Wet surface grinding (traverse cut) |
| Grinding wheel: (Japanese Industrial Standard B4131) | CBNC × B × 1A1 × 180(D) × 10(T) × 3(X) × 76.2(H) |
| Concentration: | 100 |
| Peripheral grinding speed: | 1,500 m/min. |
| Table travel: | 15 m/min. |
| Cross travel: | 2 mm/pass |
| Depth setting: | 20 μ/pass |
| Grinding fluid: | soluble-type |
| Material to be ground: | SKH-57 ($H_{RC}$ = 62) |

The test results were as follows.

| | Grinding Ratio* |
|---|---|
| Example 11-4 | 580 |
| Comp. Ex. 9 | 410 |

*Grinding ratio = $\frac{\text{Stock removal volume}}{\text{Grinding wheel wear volume}}$

EXAMPLE 12

In a nitrogen atmosphere, each of the reaction products in the form of a powder having a size smaller than 150 mesh, which were obtained in Example 6, was homogeneously mixed with hexagonal boron nitride in the form of a powder having a size smaller than 150 mesh at the mixing ratio shown in Table 12, below. The mixture was molded under a face pressure of 700 Kg/cm$^2$ into a rod having an outer diameter of 20 mm and a length of 20 mm. The rod was placed in the reaction vessel shown in FIG. 4 and was treated under the condition shown in Table 12, below, by using a high pressure press to produce cubic boron nitride.

The yield and crushing strength of the cubic boron nitride are shown in Table 12, below.

Comparative Examples 10, 11 and 12

For comparison purposes, the procedure mentioned in Example 12 was repeated wherein the following catalysts were used.

Mixture of $Li_3N$ powder, $Mg_3N$ powder, $Sr_3N$ powder and BN powder (1:0.9:4:3 by mole, i.e., the molar ratio was the same as in Ex. 6-1) (Comparative Example 10).

Mixture of $Li_3N$ powder, $Be_3N$ powder, $Mg_3N$ powder, $Ca_3N$ powder and BN powder (1.1:0.3:0.3:0.5:3 by mole, i.e., the molar ratio was the same as in Ex. 6-6) (Comparative Example 11).

Mixture of Li₃N powder, Mg₃N powder, Ca₃N powder, Sr₃N powder, Ba₃N powder and BN powder (1.2:0.3:0.4:0.4:0.3:3 by mole, i.e., the molar ratio was the same as in Ex. 6-10) (Comparative Example 12).

The reaction conditions employed and the yield and crushing strength of the cubic boron nitride prepared in each Comparative Example are shown in Table 12.

TABLE 12

| Ex. No. | HBN/Catalyst*1 | Pressure (Kb) | Temp. (°C.) | Time (min.) | Yield (%) | Crushing Strength ($10^8$ Kg/cm²) |
|---|---|---|---|---|---|---|
| 12-1 | 5 | 53 | 1450 | 10 | 43 | 4.13 |
| Comp. Ex. 10 | 5 | 53 | 1450 | 10 | 28 | 3.44 |
| 12-2 | 10 | 56 | 1450 | 10 | 36 | 4.42 |
| 12-3 | 10 | 55 | 1500 | 40 | 44 | 4.10 |
| 12-4 | 10 | 50 | 1350 | 20 | 39 | 4.11 |
| 12-5 | 5 | 56 | 1480 | 40 | 38 | 4.20 |
| 12-6 | 5 | 58 | 1450 | 10 | 40 | 4.02 |
| Comp. Ex. 11 | 5 | 58 | 1450 | 10 | 30 | 3.30 |
| 12-7 | 10 | 45 | 1400 | 30 | 41 | 3.99 |
| 12-8 | 5 | 58 | 1500 | 10 | 33 | 4.22 |
| 12-9 | 10 | 57 | 1580 | 15 | 37 | 4.11 |
| 12-10 | 5 | 57 | 1550 | 30 | 44 | 4.13 |
| Comp. Ex. 12 | 5 | 57 | 1550 | 30 | 31 | 3.35 |

As is apparent from the foregoing description, the novel boron nitride compound of the present invention is valuable as a catalyst for the production of boron nitride of the cubic system. When cubic boron nitride is prepared by using this boron nitride compound as the catalyst, the cubic boron nitride has much higher crystal grain strengths and a much better grain shape characteristic than products obtained under the same conditions by using the known catalytic substances, and is therefore very useful as an abrasive grain for grinding. Furthermore, the cubic boron nitride is obtained at a high yield and for a relatively short reaction time by using the boron nitride compound of the present invention.

The boron nitride compound of the present invention is stable in an air atmosphere and therefore easy to handle and store, and has a prolonged catalyst life.

I claim:

1. A process for producing boron nitride of the cubic system, which comprises the steps of:
maintaining a mixture of (i) a finely divided lithium nitride (Li₃N) or metallic lithium powder, (ii) a finely divided powder of at least one alkaline earth metal nitride or alkaline earth metal selected from the group consisting of calcium nitride (Ca₃N₂), barium nitride (Ba₃N₂), metallic calcium and metallic barium, and (iii) hexagonal boron nitride (BN), at a temperature of 800° to 1,300° C. in an atmosphere of an inert gas or ammonia thereby to react the ingredients (i), (ii) and (iii) with each other in a molten state;
cooling the reaction product to be thereby solidified;
mixing the reaction product with a hexagonal boron nitride powder; and then,
maintaining the thus-obtained mixture in a high-temperature and high-pressure region in which boron nitride of the cubic system is thermodynamically stable.

2. A process according to claim 1 wherein the amounts of the respective ingredient (i), (ii) and (iii) are such that the atomic ratio of the respective elements: lithium, alkaline earth metal, boron and nitrogen in said mixture is (1–1.4):(1–1.4):1:(not more than 2).

3. A process according to claim 1, wherein 5 to 50 parts by weight of the reaction product is mixed with 100 parts by weight of the hexagonal boron nitride powder.

4. A process according to claim 1, wherein the mixture of the reaction product with the hexagonal boron nitride powder is maintained at a temperature of 1,300° to 1,600° C. under a pressure of 40 to 60 kbar.

5. A process according to claim 1, wherein said reaction product comprises a compound represented by the formula: LiMBN₂ wherein M is calcium or barium.

6. A process for producing boron nitride of the cubic system, which comprises the steps of:
maintaining a mixture of (i) a finely divided lithium nitride (Li₃N) or metallic lithium powder, (ii) a finely divided powder of at least one alkaline earth metal nitride (Ca₃N₂), barium nitride (Ba₃N₂), metallic calcium and metallic barium, and (iii) hexagonal boron nitride (BN), at a temperature of 800° to 1,300° C. in an atomsphere of an inert gas or ammonia thereby to react the ingredients (i), (ii) and (iii) with each other in a molten state to produce a reaction product comprising a compound represented by the formula:

LiMBN₂ wherein M is calcium or barium;
cooling the reaction product to be thereby solidified;
mixing the reaction product with a hexagonal boron nitride powder; and
maintaining the thus-obtained mixture in a high-temperature and high-pressure region in which boron nitride of the cubic system is thermodynamically stable.

7. A process according to claim 6, wherein the amounts of the respective ingredients (i), (ii) and (iii) are such that the atomic ratio of the respective elements: lithium, alkaline earth metal, boron and nitrogen in said mixture is (1–1.4):(1–1.4):1:(not more than 2).

8. A process according to claim 6, wherein 5 to 50 parts by weight of the reaction product is mixed with 100 parts by weight of the hexagonal boron nitride powder.

9. A process according to claim 6, wherein the mixture of the reaction product with the hexagonal boron nitride powder is maintained at a temperature of 1,300° to 1,600° C. under pressure of 40 to 60 kbar.

10. A process according to claim 7, wherein 5 to 50 parts by weight of the reaction product is mixed with 100 parts by weight of the hexagonal boron nitride powder.

11. A process according to claim 10, wherein the mixture of the reaction product with the hexagonal boron nitride powder is maintained at a temperature of 1,300° to 1,600° C. under pressure of 40 to 60 kbar.

* * * * *